United States Patent
Takeda et al.

(10) Patent No.: US 8,384,821 B2
(45) Date of Patent: Feb. 26, 2013

(54) APPARATUS, METHOD, AND PROGRAM PRODUCT FOR AUTOFOCUS INCLUDING A CONTRAST OBTAINING UNIT THAT OBTAINS A FOCUS CONTRAST AND A CONTROL UNIT THAT CONTROLS A FOCUS LENS ACCORDING TO THE FOCUS CONTRAST

(75) Inventors: Hiromi Takeda, Kanagawa (JP); Takeshi Ohtsuki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 189 days.

(21) Appl. No.: 12/801,653

(22) Filed: Jun. 18, 2010

(65) Prior Publication Data
US 2011/0050983 A1    Mar. 3, 2011

(30) Foreign Application Priority Data
Aug. 31, 2009  (JP) ................. 2009-199412

(51) Int. Cl.
*H04N 5/232* (2006.01)
(52) U.S. Cl. ........................ 348/353; 348/345
(58) Field of Classification Search .............. 348/345, 348/348, 349, 353
See application file for complete search history.

(56) References Cited

U.S. PATENT DOCUMENTS

| | | |
|---|---|---|
| 7,298,411 B2 | 11/2007 | Aoki |
| 7,702,231 B2 | 4/2010 | Sugimoto |
| 2003/0174233 A1* | 9/2003 | Onozawa ............... 348/349 |
| 2004/0001158 A1 | 1/2004 | Aoki |
| 2004/0212721 A1* | 10/2004 | Watanabe ............ 348/345 |
| 2006/0227238 A1* | 10/2006 | Kuroki et al. ........ 348/353 |
| 2007/0064145 A1 | 3/2007 | Sugimoto |
| 2008/0036902 A1* | 2/2008 | Tanaka ................ 348/353 |
| 2008/0252773 A1* | 10/2008 | Oishi .................. 348/347 |
| 2009/0086083 A1 | 4/2009 | Kunishige et al. |
| 2009/0185799 A1* | 7/2009 | Kawarada ............ 396/125 |
| 2009/0237552 A1* | 9/2009 | Yuba .................. 348/349 |
| 2010/0002128 A1* | 1/2010 | Ishii .................... 348/349 |

FOREIGN PATENT DOCUMENTS

| | | |
|---|---|---|
| JP | 2003-140035 A | 5/2003 |
| JP | 2003-348426 A | 12/2003 |
| JP | 2007-34261 A | 2/2007 |
| JP | 2007-101907 A | 4/2007 |
| JP | 2009-88679 A | 4/2009 |

OTHER PUBLICATIONS

Korean Office Action dated Jul. 29, 2011, with English translation.
Japanese Notification of Reasons for Rejection dated Jan. 8, 2013, with English-language translation.

* cited by examiner

*Primary Examiner* — Tuan Ho
(74) *Attorney, Agent, or Firm* — McGinn IP Law Group, PLLC

(57) ABSTRACT

An exemplary embodiment of the present invention is an autofocus method that includes moving a focus lens according to an image signal generated from an image of a subject formed by an imaging optical system with a focus lens, obtaining a focus contrast of each of multiple image signals generated in a case of moving a position of the focus lens; and determining a moving direction of the focus lens according to the multiple obtained focus contrasts in response to a focus instruction.

8 Claims, 8 Drawing Sheets

APPARATUS, METHOD, AND PROGRAM PRODUCT FOR AUTOFOCUS INCLUDING A CONTRAST OBTAINING UNIT THAT OBTAINS A FOCUS CONTRAST AND A CONTROL UNIT THAT CONTROLS A FOCUS LENS ACCORDING TO THE FOCUS CONTRAST

This application is based upon and claims the benefit of priority from Japanese patent application No. 2009-199412, filed on Aug. 31, 2009, the disclosure of which is incorporated herein in its entirety by reference.

BACKGROUND

1. Field of the Invention

The present invention relates to an autofocus technology that automatically adjusts the focused state of a subject in an imaging apparatus.

2. Description of Related Art

The imaging apparatuses such as a digital still camera and a digital video camera which has an image sensor, for example a CCD (Charge Coupled Device) sensor and a CMOS (Complementary Metal Oxide Semiconductor) sensor, have been input into practical use. As the autofocus (AF) method applied to these imaging apparatus, the contrast detection method which uses through-the-lens images obtained by the image sensor is known.

The contrast detection method uses that the contrast of the through-the-lens image obtained by the image sensor increases if the subject image formed by the imaging optical system on the imaging surface is focused.

Specifically, by moving the position of the focus lens or the image sensor included in the imaging optical system, and sequentially changing the imaging position of the subject image, the through-the-lens images are sequentially obtained. Then, the contrasts of multiple through-the-lens images sequentially obtained by the image sensor are obtained, and the imaging position of the subject image where the contrasts reach their maximum is determined as the focal position.

The integrated value of the high frequency component in the spatial frequency is used for the contrasts, for example. In the continuous AF, the position of the focus lens where the contrast of the through-the-lens images reaches its peak is searched while driving the focus lens by step.

Further, there is a known imaging apparatus for performing the face detection process that detects the image of a person's face included in the shooting screen obtained by the image sensor, and the focusing control in order to focus on the detected face image (Japanese Unexamined Patent Application Publication No. 2007-34261 (Sugimoto)).

In the technique disclosed by Sugimoto, as illustrated in FIG. 9, in a case of the continuous'AF (YES in the step 35), the focusing range which is to be the moving range of the focus lens in the usual search process is determined using the result of the continuous AF (step 36). Then the focus lens is moved within the determined focusing range, and the usual search is performed.

FIG. 10 illustrates the result of the continuous AF (upper side), and the usual search operation (lower side) in the technique disclosed by Sugimoto. As illustrated in the upper side of FIG. 10, by performing the continuous AF using the through-the-lens image data, it is possible to obtain a position Z12 of the focus lens when the through-the-lens image is focused. The range between the distance a on the NEAR side away from the position Z12 of the focus lens and the to distance b on the INF side from the position Z12 is determined as a focusing range (Z11 to Z13).

Japanese Unexamined Patent Application Publication No. 2003-348426 (Aoki) discloses that when a shutter button is pressed during the continuous AF, the operation of the usual search afterward is determined depending on the operation in the continuous AF. If the shutter button pressed state is in the finely adjustment of the focus lens position or movement of the focus lens to the focused position corresponding to the peak position, in the usual search, the search is performed in the range of the current position or the peak position. Further, in the state of moving the focus lens and searching for the peak position, the usual search is performed from the current position of the focus lens toward the current driving direction.

SUMMARY

In the continuous AF, the focus lens is always moving. For this reason, when the imaging apparatus or the subject is moving, if the continuous AF is stopped at the time of actual shooting, the focus lens is not necessarily in the vicinity of the focal position. Therefore, as in the technique disclosed by Sugimoto, even if the predetermined distance on the INF and NEAR sides from the focal position during the continuous AF is determined as the focus lens moving range, a correct focal position is not necessarily within the moving range.

Further, as in the technique disclosed by Aoki, even if the neighborhood range of the current position and the peak position is determined to be the moving range of the focus lens in the usual search, the correct focal position is not necessarily within the moving range if the imaging apparatus or the subject is moving. When the search operation is performed from the current position of the focus lens toward the present driving direction, the correct focal position may be at the opposite side to the present driving direction.

Thus, the present inventors have found a problem in the techniques disclosed by Sugimoto and Aoki that the focus lens cannot be moved to the accurate focal position, and thereby disabling to obtain a favorable photographic image.

An exemplary aspect of the present invention is an autofocus apparatus including an imaging unit that generates an image signal from an image of a subject formed by an imaging optical system including a focus lens, a driving unit that moves the focus lens according to the image signal, an contrast obtaining unit that obtains a focus contrast of each of multiple image signals, where the image signals are generated in a case of moving a position of the focus lens by the driving unit, and a control unit that in response to a focus instruction, determines a moving direction of the focus lens according to the multiple focus contrasts obtained by the contrast obtaining unit, and notifies the moving direction of the focus lens to the driving unit.

Another exemplary aspect of the present invention is an autofocus method that includes moving a focus lens according to an image signal, where the image signal is generated from an image of a subject formed by an imaging optical system including a focus lens, obtaining a focus contrast of each of the multiple image signals generated in a case of moving a position of the focus lens, and determining a moving direction of the focus lens according to the multiple obtained focus contrasts in response to a focus instruction.

Another exemplary aspect of the present invention is a computer program product including a computer usable medium having computer readable program code embodied therein that includes computer readable program code configured to cause a computer to move a focus lens according to an image signal, where the image signal is generated from an image of a subject formed by an imaging optical system including a focus lens, obtain a focus contrast of each of the multiple image signals generated at the time of moving a position of the focus lens, and determine a moving direction of the focus lens according to the multiple obtained focus contrasts in response to a focus instruction.

As described above, the present invention enables to determine the moving direction of the focus lens at the time of actual shooting according to the focus contrasts of each of the multiple image signals which are obtained before the focus instruction is made by moving the focus lens. This enables to move the focus lens to the accurate focal position even for a moving subject, thereby achieving a favorable photographic image.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
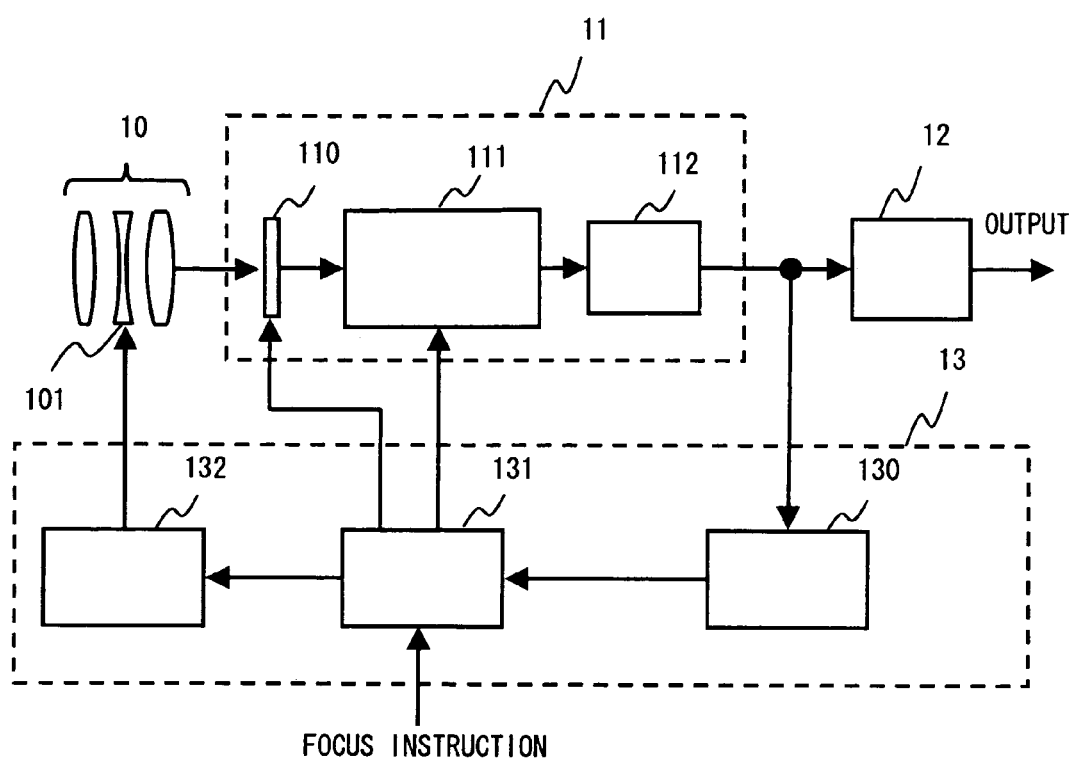
FIG. 1 is a block diagram illustrating the configuration of an imaging apparatus using an autofocus apparatus according to a first exemplary embodiment.

The configuration of an imaging apparatus using an autofocus apparatus according to the first exemplary embodiment is described with reference to FIG. 1. FIG. 1 is a block diagram illustrating the main configuration of the imaging apparatus 1 according to this exemplary embodiment. As illustrated in FIG. 1, the imaging apparatus includes an imaging optical system 10, an imaging unit 11, an image processing unit 12, and a focus processing unit 13. Hereinafter, each component included in FIG. 1 is explained in order.

In FIG. 1, the imaging optical system 10 is an optical lens group for forming a subject image on the imaging surface of an imaging sensor 110, which is described later. The imaging optical system 10 includes a focus lens 101. A driving unit 132, which is described later, can move the focus lens 101 in the optical axis direction that connects the imaging optical system 10 and the image sensor 110.

The imaging unit 11 includes the image sensor 110, an analog signal processing unit 111, and an A/D conversion unit 112. The image sensor 110 performs photoelectric conversion of an optical signal entered via the imaging optical system 10, and then outputs an analog signal to the analog signal processing unit 111. The image sensor 110 is for example a CCD (Charge Coupled Device) and a CMOS (Complementary MOS) image sensor.

The analog signal processing unit 111 performs amplification process and noise removing process or the like to the analog image signal supplied from the image sensor 110. The A/D conversion unit 112 generates image data as a digital image signal by sampling the analog image signal supplied from the analog signal processing unit 111.

The image processing unit 12 performs image processing, such as color correction, white balance adjustment, and gamma correction to the image data supplied from the A/D conversion unit 112.

The focus processing unit 13 performs autofocus process by the contrast detection system using the through-the-lens image generated by imaging unit 11. The through-the-lens image is generated by the image sensor 110 at a predetermined frame rate (sampling interval).

In the continuous AF, the lens is continuously and minutely operated in order to have little fluctuation in the display angle of view. Further, in the characteristic of the lens depth of field, the amount of change in the contrasts near the focal position becomes extremely small. If the contrast is low, the change in the contrast is small and susceptive to the influence of noise.

Therefore in the present invention, if a focus instruction is supplied during the continuous AF, while stopping the continuous AF and performing shooting process, the usual search for searching the focal position is performed again. This enables to detect more accurate focal position. The usual search is a search method of acquiring contrast within the predetermined range of search, not only surroundings of the existence of the lens at present, and retrieving position where contrast is the highest.

The focus processing unit 13 according to this exemplary embodiment performs the continuous AF and the usual search process. In the continuous AF, the focus processing unit 13 sequentially searches for the position of the focus lens 101 where the contrasts of the through-the-lens images reach their peak (peak position) while driving the focus lens 101 by step.

In the usual search, the focus processing unit 13 sequentially obtains the through-the-lens images while moving the focus lens 101 at a smaller step than the continuous AF in response to the focus instruction, and then moves the focus lens 101 to the focal position where the contrasts reach their maximum. The focus instruction is generated by half-press of the shooting button of the digital still camera, for example.

In the configuration example of FIG. 1, the focus processing unit 13 includes a contrast obtaining unit 130, a control unit 131, and a driving unit 132. The contrast obtaining unit 130 obtains the contrasts of the through-the-lens images generated by the imaging unit 11. As the contrast, various parameters reflecting the size of the contrast of the through-the-lens image can be used.

For example, the size of the high frequency component in the spatial frequency spectrum of the through-the-lens images obtained by the discrete cosine transform (DCT) can be used as the contrast. Further, the difference of the pixel values (absolute value) between adjacent pixels in the horizontal or vertical directions is computed for each pixel in the through-the-lens images, and the integrated value of the obtained difference of the pixel values may be used as the contrast.

Note that the focus processing unit 13 may detect a specific area (for example a person's face area) included in the shooting screen which is generated by the imaging unit 11, and perform the autofocus process so that the contrast in the specific area reaches its maximum.

The control unit 131 uses multiple contrasts obtained by the contrast obtaining unit 130 during the continuous AF while driving the focus lens 101 by step, so as to output a driving instruction of the focus lens 101 to the driving unit 132 to continue focusing on the moving subject. The history of the multiple contrasts obtained during the continuous AF is stored in a storage unit (not illustrated) of the contrast obtaining unit 130.

When the focus instruction is supplied, the control unit 131 stops the continuous AF and shifts to the operation of the usual search. In the usual search process, the driving direction of the focus lens 101 is determined using the history of the contrast immediately before stopping the continuous AF. The determination method of the driving direction of the focus lens 101 is explained later in detail. Then the control unit 131 outputs the determined driving direction to the driving unit 132. The driving unit 132 moves the focus lens 101 in the driving direction along the optical axis direction under the control by the control unit 131.

In a case of moving the focus lens 101 in the driving direction determined using multiple contrasts during the continuous AF, the driving unit 132 moves the focus lens 101 at a smaller step than the step in the continuous AF. The control unit 131 makes the imaging unit 11 sequentially obtain the through-the-lens images while moving the position of the focus lens 101. The contrasts of the through-the-lens images at this time are used to evaluate the focused state on the imaging surface of the image sensor 110. This enables to determine the position of the focus lens 101 that achieves more accurate focused state.

Note that the search algorithm of the focal position performed by the control unit 131 may incorporate the technique to estimate the contrast from the position of the focus lens 101 by the approximated curves such as a Gaussian curve and a quadratic curve or the characteristic curve obtained in an experiment, and predict the focal position where the contrast reaches its maximum. The present invention is not limited to these specific examples, however various known algorithms may be applied for the evaluation of the focused state using the contrasts performed by the control unit 131.

Figure 2:
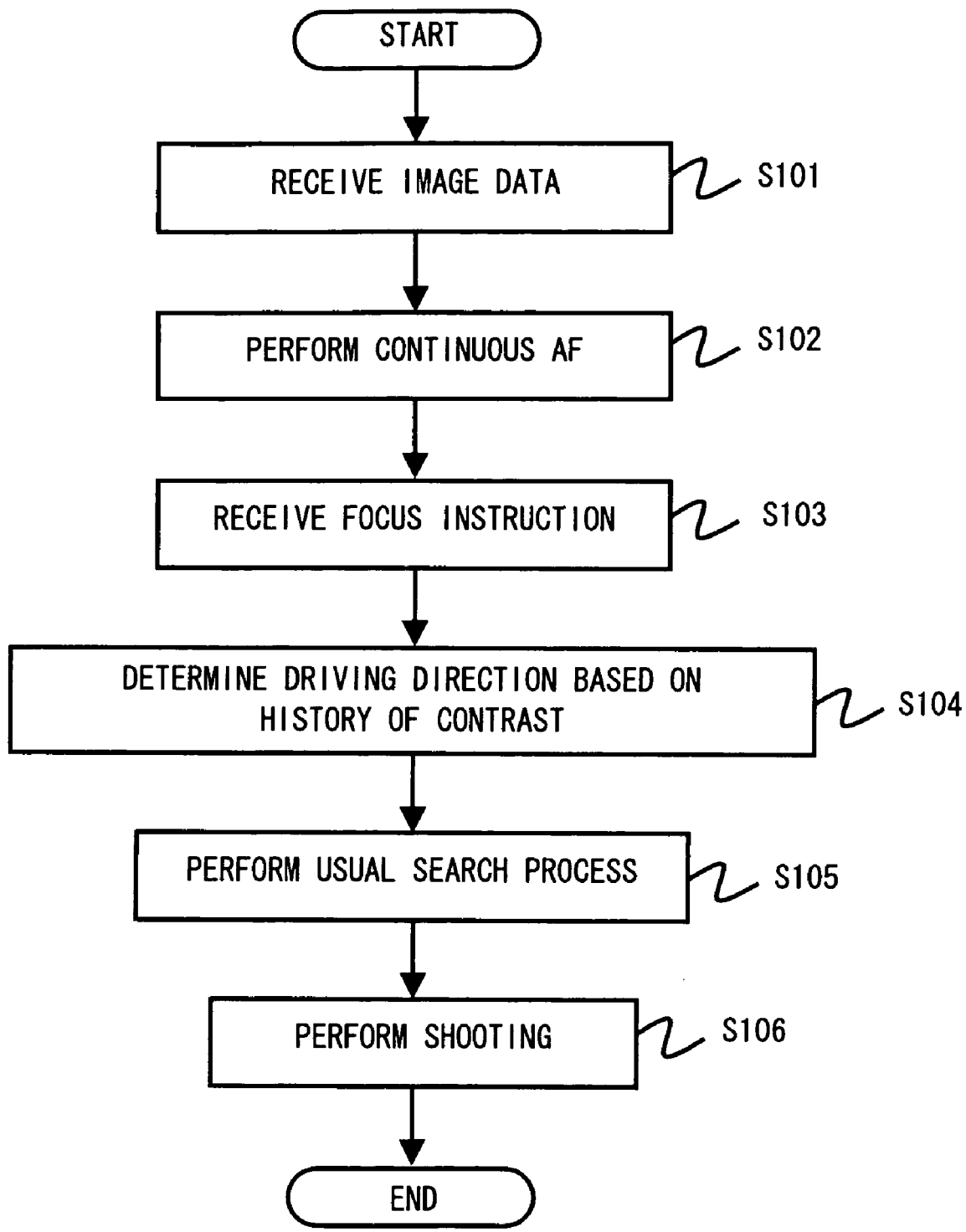
FIG. 2 is a flowchart for explaining the autofocus method according to the first exemplary embodiment.
Figure 3:
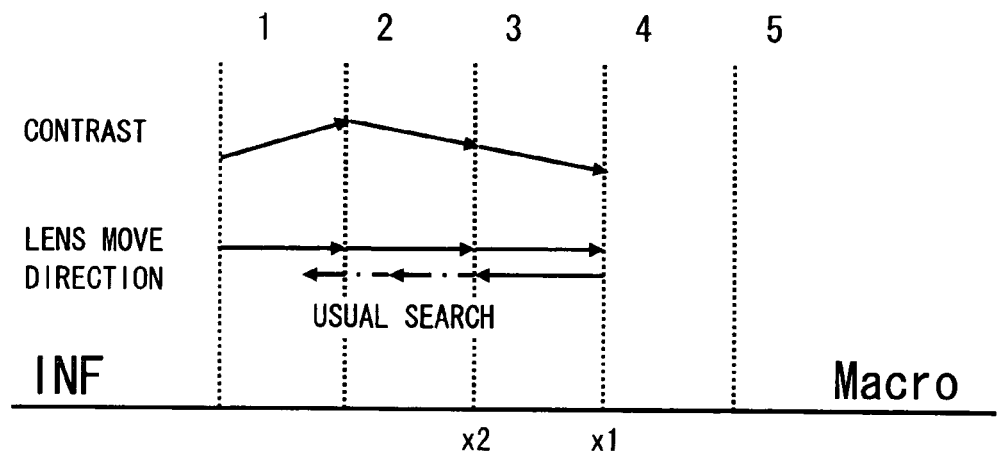
FIG. 3 explains the determination process procedure of a focus lens driving direction according to the first exemplary embodiment.
Figure 4:
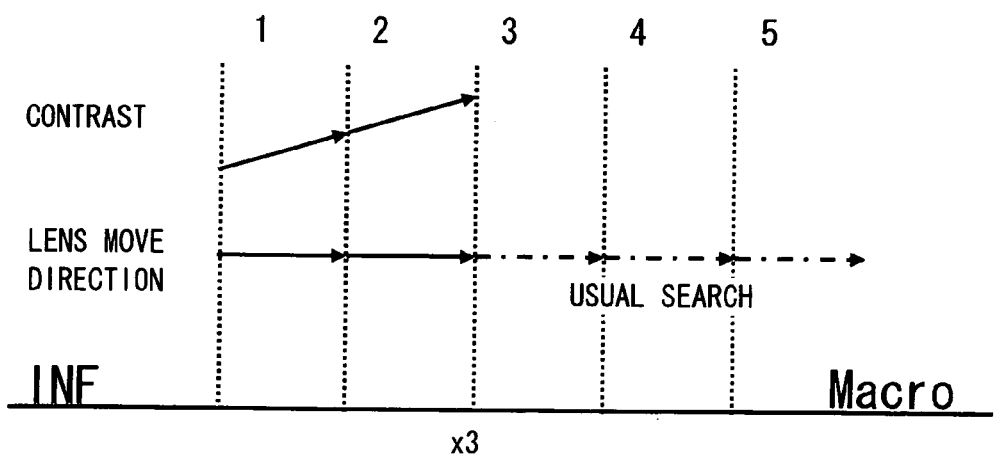
FIG. 4 explains the determination process procedure of the focus lens driving direction according to the first exemplary embodiment.
Figure 5:
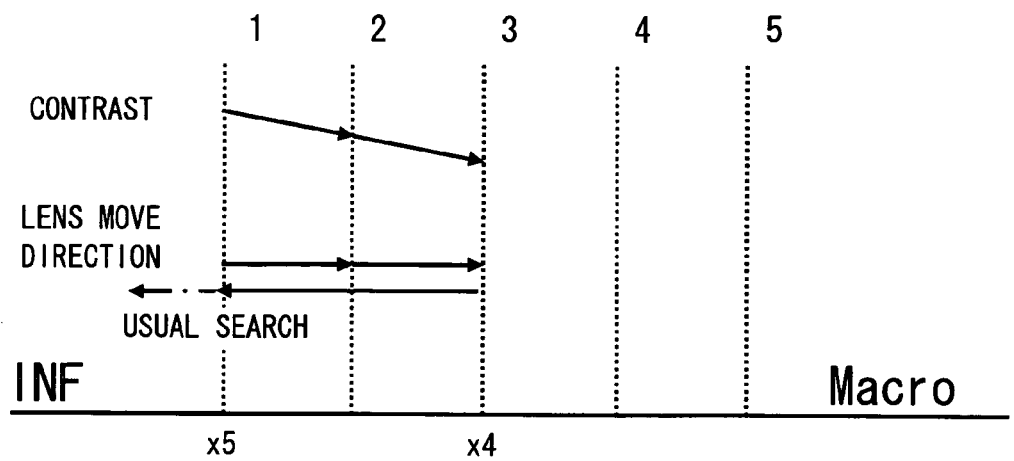
FIG. 5 explains the determination process procedure of the focus lens driving direction according to the first exemplary embodiment.

The process procedure of the autofocus performed by the focus processing unit 13 is explained hereinafter with reference to FIGS. 2 to 5. FIG. 2 is a flowchart illustrating the autofocus process procedure performed by the focus processing unit 13 according to this exemplary embodiment. FIGS. 3 to 5 explain the determination process procedure of the driving direction of the focus lens 101 in the usual search process.

In FIGS. 3 to 5, the upper row indicates the transition of the contrast, whereas the lower row indicates the moving direction of the focus lens 101. Further, the symbols 1 to 5 in the drawings indicate the evaluation periods in which the focus lens 101 is driven by step and the contrasts are obtained in the continuous AF. The directions of the arrows indicate the direction to which the focus lens 101 moves in one evaluation period. In FIGS. 3 to 5, the left-hand side is INF side and the right-hand side is Macro side. The Macro side is equivalent to the NEAR side in the technique disclosed by Sugimoto.

As illustrated in FIG. 2, the image data generated by the imaging unit 11 is supplied to the focus processing unit 13 (S101). Then the continuous AF is performed while driving the focus lens 101 by step (S102). At this time, the contrasts during the continuous AF are stored in the storage unit of the contrast obtaining unit 130.

After that, in response to the reception of the focus instruction (S103), the continuous AF is stopped and the driving direction of the focus lens 101 is determined according to the history of the contrasts during the continuous AF (S104).

First, an example illustrated in FIG. 3 is explained. In the example illustrated in FIG. 3, the focus lens 101 proceeds toward the Macro side immediately before stopping the continuous AF. The contrast increases in the evaluation period 1, and decreases in the evaluation periods 2 and 3. Therefore, an accurate focal position is considered to exist between the evaluation period 1 and 2.

In this case, it is assumed that the focus instruction is supplied at the time the evaluation period 3 ends. The position of the focus lens 101 at this time shall be x1. In the usual search, the moving direction of the focus lens 101 is determined so as to intensively search in the vicinity of the evaluation periods 1 and 2. First, the focus lens 101 is returned so that the vicinity of the evaluation periods 1 and 2 including the peak position is to be the moving range of the focus lens in the usual search. In this exemplary embodiment, the focus lens 101 is returned to the INF side by step of the continuous AF from x1.

That is, the focus lens 101 is returned to the position at the time the evaluation period 2 ends. The position of the focus lens 101 at this time shall be x2. This x2 is to be the driving start position of the focus lens 101 in the usual search. By returning to the vicinity of the peak position and starting the usual search from the position, the time required for the usual search can be reduced.

In the usual search, the focus lens 101 is moved at a smaller step than the step of the continuous AF toward the INF side from the x2 position, as indicated by the long and short dashed line in FIG. 3. Then the contrasts are obtained and evaluated. This enables to determine a more accurate focal position in a short time.

In the example illustrated in FIG. 4, the focus lens 101 proceeds toward the Macro side immediately before stopping the continuous AF. The contrast increases in the evaluation periods 1 and 2. Therefore, an accurate focal position is considered to exist at the position closer to the Macro side than the position of the focus lens 101 in the evaluation period 2.

In this case, it is assumed that the focus instruction is supplied at the time the evaluation period 2 ends. The position of the focus lens 101 at this time shall be x3. In the usual search, the moving direction of the focus lens 101 is determined so as to search closer to the Macro side than x3. In the usual search, the focus lens 101 is moved at a smaller step than the step of the continuous AF toward the Macro side from the x3 position, as indicated by the long and short dashed line in FIG. 4. In this example, x3 is the driving start position of the focus lens 101 in the usual search.

In the example illustrated in FIG. 5, the focus lens 101 proceeds toward the Macro side immediately before stopping the continuous AF. The contrast decreases in the evaluation periods 1 and 2. Therefore, an accurate focal position is considered to exist at the position closer to the INF side than the position of the focus lens 101 in the evaluation period 1.

In this case, it is assumed that the focus instruction is supplied at the time the evaluation period 2 ends. The position of the focus lens 101 at this time is shall be x4. In the usual search, the moving direction of the focus lens 101 is determined so as to search closer to the INF side than the position of the focus lens 101 in the evaluation period 1.

First, the focus lens 101 is returned to the INF side by two steps of the continuous AF from x4. That is, the focus lens 101 is moved to the position of the focus lens 101 at the time of the evaluation period 1. The position of the focus lens 101 at this time shall be x5. This x5 is the driving start position of the focus lens 101 in the usual search.

As described above, by returning the focus lens 101 by two steps, it is possible to reduce the time required for the focusing operation. In the usual search, as indicated by the long and short dashed line in FIG. 5, the moving direction of the focus lens 101 is determined so as to search closer to the INF side than x5. That is, the focus lens 101 is moved at a smaller step than the step of the continuous AF toward the INF side from the x5 position.

Thus, in the present invention, the driving direction of the focus lens 101 is determined according to the history of the contrast immediately before stopping the continuous AF. Then, the usual search is performed (S105). In the usual search, the contrasts are obtained while moving the focus lens 101 in the determined driving direction so as to move the focus lens 101 to the accurate focal position.

Finally, the shooting process is performed while the usual search is completed (S106). The image data obtained in S106 is stored in a memory (not illustrated) after the image processing unit 12 performs the image process. Note that a series of processes illustrated in FIG. 2 including performing the continuous AF, the usual search, and shooting, may be carried out in response to a press operation of the shutter button (not illustrated) provided in the imaging apparatus 1 by a user. Note that before performing the shooting process, an automatic exposure (AE) process may be performed following the autofocus process in order for the photographic image to have appropriate brightness.

Thus, in the present invention, the driving direction of the focus lens 101 in the usual search after receiving the focus instruction is determined according to the history of the contrasts during the continuous AF. Therefore, the focus lens 101 can be driven from the position where the continuous AF is stopped to a more accurate focal position. This enables obtain a favorable photographic image.

In the usual search, the focus lens 101 is moved at a smaller step than the step driving operation during the continuous AF. This enables to obtain a more focused favorable photographic image.

As in the technique disclosed by Aoki, if the search is performed from the current position toward the current driving direction, a correct focal position may be the opposite side of the current driving direction, thereby possibly leading to more time in the usual search. However, in the present invention, the focus lens 101 is driven from the position where the continuous AF is stopped toward a more accurate focal position, thus the time required for the autofocus process can be reduced.

Further, if the contrasts continue to decrease during the continuous AF and the peak position cannot be detected, the process returns to the first evaluation period and the usual search is started therefrom. If the peak position is detected, the process returns to the vicinity of the peak position and the usual search is started therefrom. This enables to reduce the time required for the autofocus process.

Second Exemplary Embodiment

An automatic focusing apparatus according to the second exemplary embodiment is described with reference to FIGS. 6 and 7. Note that as the imaging apparatus illustrated in FIG. 1 can be used for the imaging apparatus that performs the autofocus method according to this exemplary embodiment, the explanation for the imaging apparatus is omitted.

Figure 6:
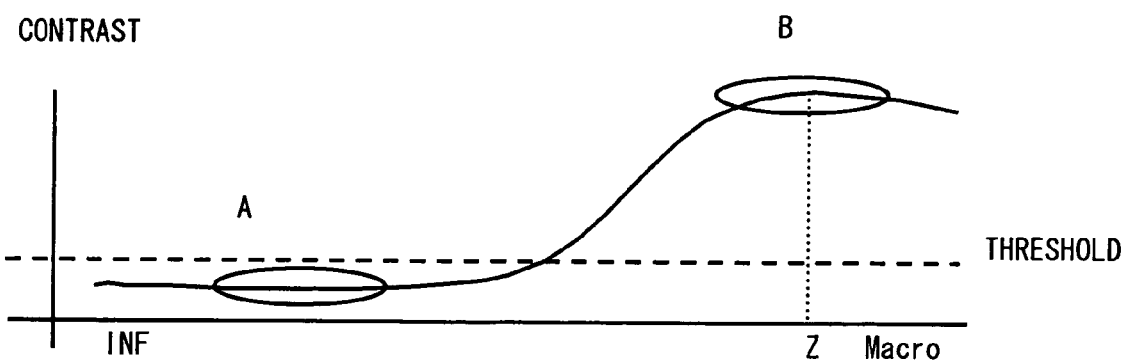
FIG. 6 is a graph illustrating an example of a change in the contrast along with the movement of the focus lens.

FIG. 6 is a graph illustrating an example of a change in the contrast along with the movement of the focus lens 101. In FIG. 6, the horizontal axis indicates the position of the focus lens 101, and the vertical axis indicates the contrast. In the example illustrated in FIG. 6, the contrast increases as the focus lens 101 is moved toward the Macro side from the INF side.

As indicated by A in FIG. 6, if the contrast continues to be low, even if the conditions indicated in FIGS. 3 to 5 are satisfied, it is difficult to detect an accurate focal position. This is because that if the contrast is low, the change in the contrast value is small and the contrast is subject to the influence of noise.

Therefore, in the section A, if the process shifts to FIGS. 3 to 5 or the process of other pattern, the evaluation may be performed based on wrong information taking account of the noise, thereby causing to be wrongly focused (blurred). On the other hand, as indicated by B in FIG. 6, if the contrast continues to be high, the influence of the noise is small, thereby enabling to determine a relatively accurate focal position.

Therefore, in this exemplary embodiment, if the contrast is more than or equal to a predetermined threshold, the abovementioned autofocus process according to the first exemplary embodiment is performed to determine a more accurate focal position. On the other hand, if the contrast is smaller than the predetermined threshold, the abovementioned autofocus process is not performed. In this case, for example, the autofocus process of the first exemplary embodiment can be skipped and the process shifts to the shooting process.

Figure 7:
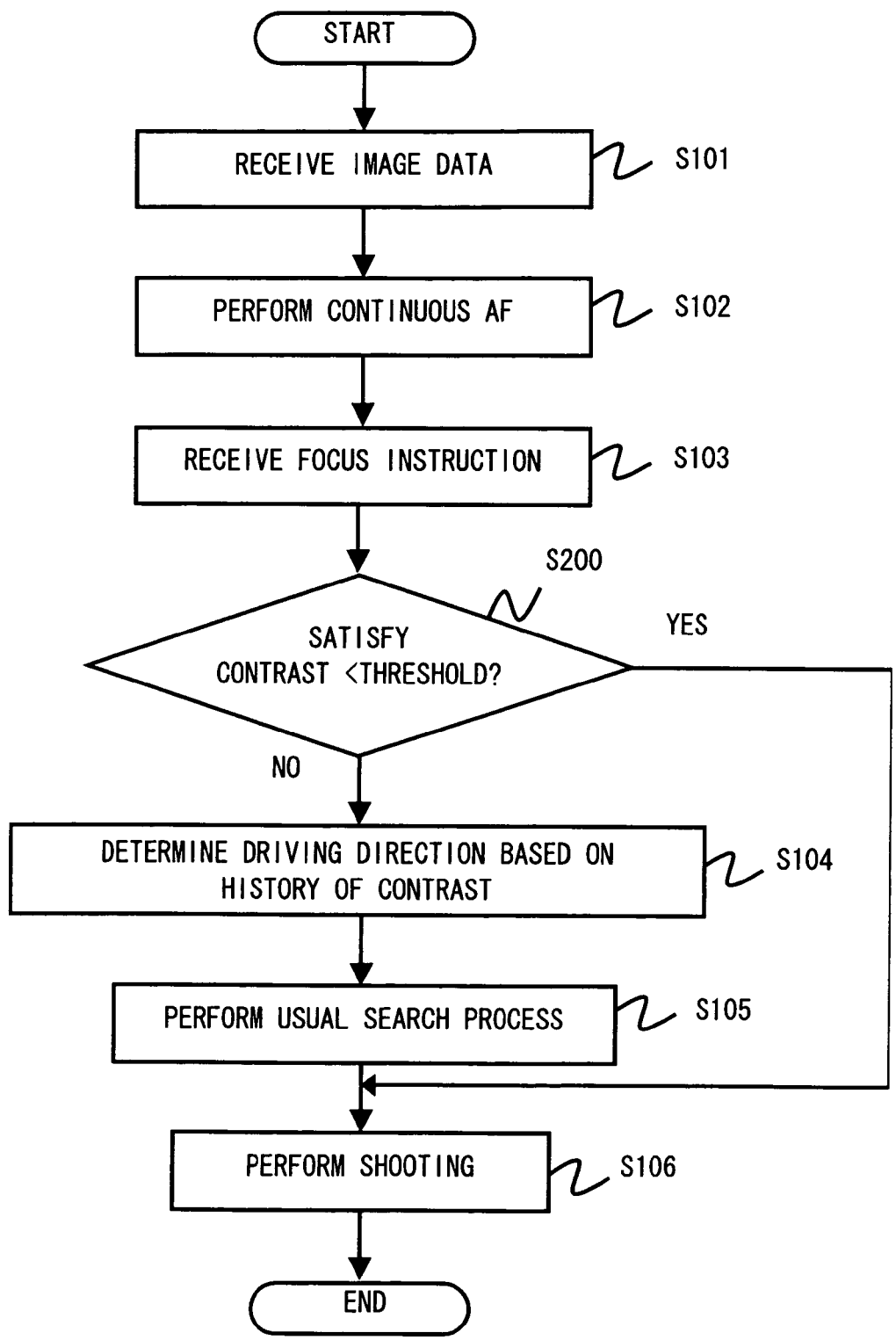
FIG. 7 is a flowchart for explaining an autofocus method according to a second exemplary embodiment.

FIG. 7 is a flowchart explaining the autofocus method according to this exemplary embodiment. As illustrated in FIG. 7, after the focus instruction is received (S103), and the continuous AF is stopped, the stored contrast is evaluated to be lower than the threshold (whether or not to satisfy the evaluation formula; contrast<threshold) (S200). The control unit 131 can perform this evaluation, for example.

If the contrast is more than or equal to the threshold (S200, NO), the processes of S104 and S105 are performed, and the shooting process is performed with a more accurate focal position (S106). On the other hand, if the contrast is lower than the threshold (S200, YES), the processes of S104 and S105 are skipped and the shooting process is performed (S106).

As described above, whether the focus lens needs to be moved or not is evaluated from the contrasts immediately before stopping the continuous AF. If the contrast is low, the determination of the driving direction of the focus lens 101 and the usual search are omitted. This enables to reduce the time till the shooting process.

Note that if the contrast is lower than the threshold, a notification indicating of the unfocused state may be made, so that entire area of the moving range of the focus lens 101 is searched again to determine a more accurate focal position. This reduces the wrong focused (blurred) state due to the influence of noise, and obtain a more favorable photographic image.

Third Exemplary Embodiment

Figure 8:
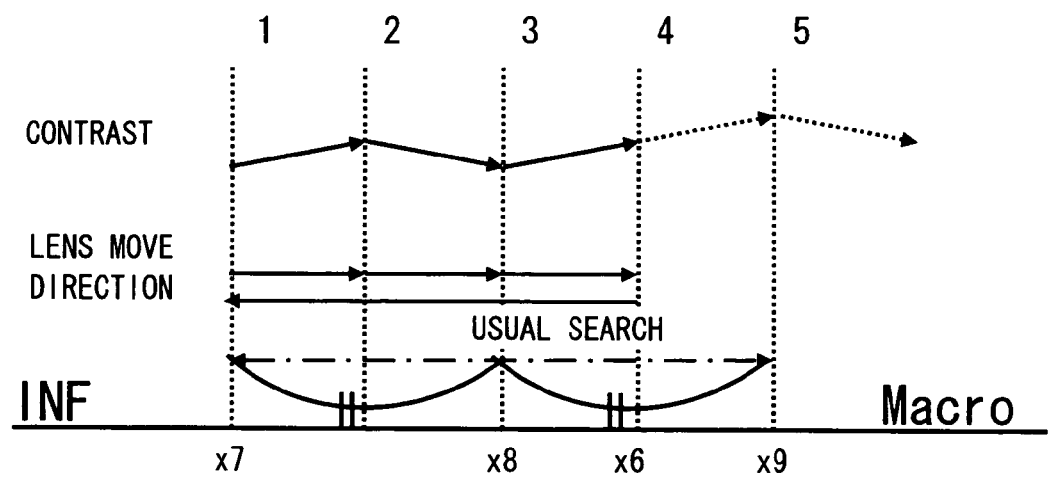
FIG. 8 explains the determination process procedure of the focus lens driving direction according to a third exemplary embodiment.
Figure 9:
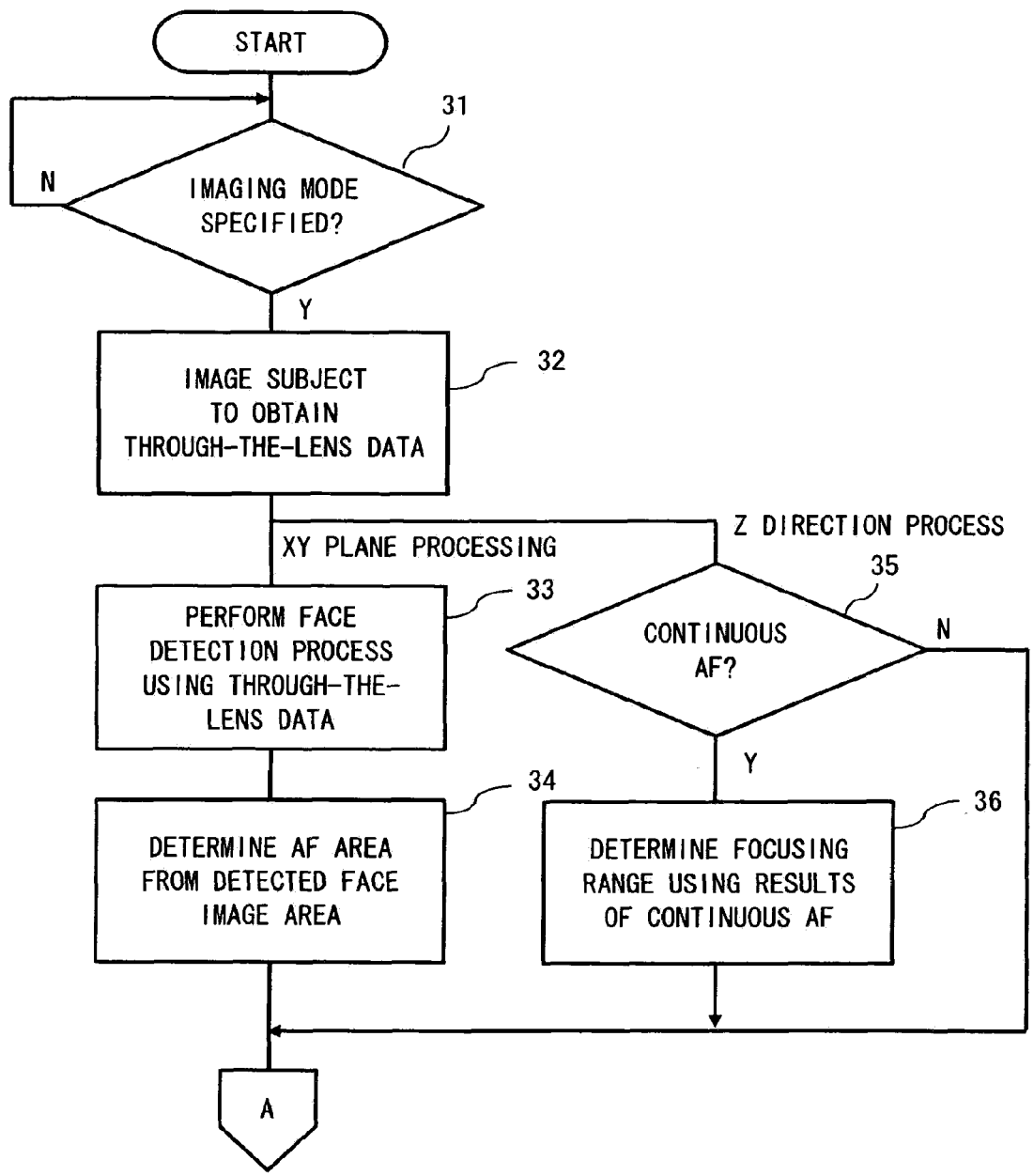
FIG. 9 is a flowchart for explaining the autofocus method disclosed by Sugimoto.
Figure 10:
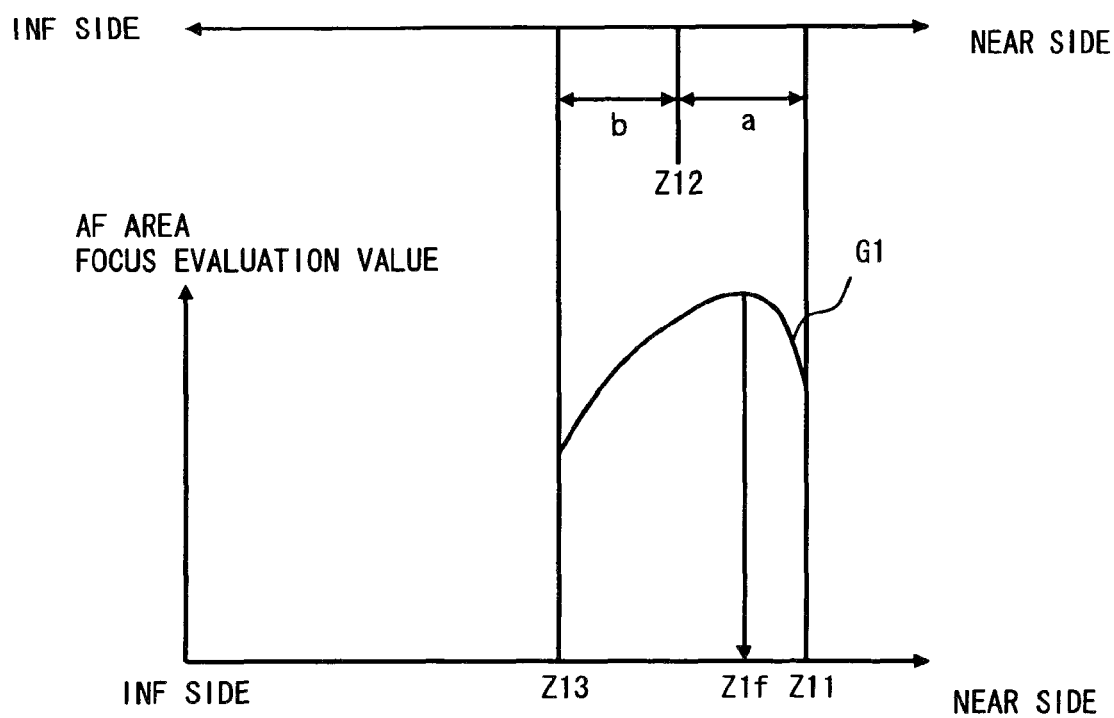
FIG. 10 explains the autofocus method disclosed by Sugimoto.

The autofocus method according to the third exemplary embodiment of the present invention is explained with reference to FIG. 8. FIG. 8 explains the determination process procedure of the driving range of the focus lens according to the third exemplary embodiment. In the abovementioned exemplary embodiments, the driving direction and the driving start position of the focus lens 101 are determined. In this exemplary embodiment, the driving range of the focus lens 101 is determined.

As illustrated in FIG. 8, suppose that the contrast increases in the evaluation period 1, decreases in the evaluation period 2, and increases in the evaluation period 3. In this case, it is assumed that the focus instruction is received at the time the evaluation period 3 ends.

As the contrast increases in the evaluation period 3, if the focus lens 101 is moved further toward the Macro side, the contrast higher than the contrast at the peak position in the evaluation period 2 may be obtained as indicated by the arrow of the dotted line.

In this case, the focus lens 101 is returned from the position of x6 to x7 so as to include the peak position included in the history of the contrasts. Then, a certain range centering on x8 where the contrast changed from decrease to increase is set to the driving range of the focus lens 101.

For example, the range (range from x7 to x9) with equal distance from x8 to x7 by the INF side, and the distance from x8 to x9 by the Macro side can be specified as the moving range of the focus lens 101 to perform the usual search. By determining the usual search range in this way, a more accurate focal position can be searched.

By the way, the processes performed by the focus processing unit 13 can be achieved by the computer having a memory for storing the image data and a CPU (Central Processing Unit) to perform the program describing the procedure of each step in FIG. 2.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The abovementioned exemplary embodiments of the present invention indicated an example of adjusting the imaging position of the subject image by moving the focus lens 101 included in the imaging optical system. However, the imaging position of the subject image can be adjusted by moving the image sensor 110.

Further, it is needless to say that the present invention is not limited to the above exemplary embodiments, but As for this invention, it is needless to say for various change to be possible in the range which does not deviate from the gist of this invention which it is not limited only to the embodiment mentioned above and was already described.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An autofocus method comprising:
    generating, by an imaging unit, an image signal from an image of a subject formed by an imaging optical unit including a focus lens;
    moving the focus lens, by a driving unit, according to an image signal;
    obtaining a focus contrast, by a contrast obtaining unit, of each of at least three consecutive image signals generated when moving a position of the focus lens, the plurality of consecutive image signals being generated when moving a position of the focus lens by the driving unit;
    storing, by a storage unit, a history of the obtained focus contrasts of the plurality of consecutive image signals; and
    determining, by a control unit in response to a focus instruction, a moving direction of the focus lens according to the history of obtained focus contrasts of the plurality of consecutive image signals before stopping a continuous autofocus, and notifies the moving direction of the focus lens to the driving unit.

2. The autofocus method according to claim 1, wherein the control unit determines a moving start position of the focus lens,
    wherein the control unit determines a moving range of the focus lens,
    wherein a moving of the focus lens after receiving the focus instruction is less than a moving of the focus lens when obtaining the focus contrast, and
    wherein the control unit, in response to a focus instruction, automatically determines a moving direction of the focus lens according to the history of obtained focus contrasts of the plurality of consecutive image signals immediately before stopping a continuous autofocus, and automatically notifies the moving direction of the focus lens to the driving unit.

3. The autofocus method according to claim 1, further comprising, when the obtained contrast is greater than a predetermined threshold, determining, by the control unit, a moving direction of the focus lens according to a plurality of focus contrasts obtained by the contrast obtaining unit in response to a focus instruction for an increased accuracy for a focal position than a previous focus instruction.

4. The autofocus method according to claim 1, wherein the determining of the moving direction, by the control unit, of the focus lens at a time of actual shooting an image is according to the focus contrasts of each of the consecutive image signals which are obtained before focus instructions are made by moving the focus lens.

5. An autofocus apparatus comprising:
    an imaging unit that generates an image signal from an image of a subject formed by an imaging optical unit including a focus lens;
    a driving unit that moves the focus lens according to the image signal;
    a contrast obtaining unit that obtains a focus contrast of each of a plurality of consecutive image signals, the plurality of consecutive image signals being generated when moving a position of the focus lens by the driving unit;

a storage unit that stores a history of the obtained focus contrasts of the plurality of consecutive image signals; and a control unit, in response to a focus instruction, that determines a moving direction of the focus lens according to the history of obtained focus contrasts of the plurality of consecutive image signals before stopping a continuous autofocus, and notifies the moving direction of the focus lens to the driving unit.

6. The autofocus apparatus according to claim 5, wherein when the obtained contrast is greater than a predetermined threshold, the control unit determines a moving direction of the focus lens according to a plurality of focus contrasts obtained by the contrast obtaining unit in response to a focus instruction for an increase in accuracy of the focal position as compared to a previous focus instruction.

7. The autofocus apparatus according to claim 5, wherein the control unit determines the moving direction of the focus lens at a time of actual shooting an image according to the focus contrasts of each of the consecutive image signals which are obtained before focus instructions are made by moving the focus lens.

8. The autofocus apparatus according to claim 5, wherein the control unit determines a moving start position of the focus lens, wherein the control unit determines a moving range of the focus lens, wherein a moving of the focus lens after receiving the focus instruction is less than a moving of the focus lens when obtaining the focus contrast, and wherein the control unit, in response to a focus instruction, automatically determines a moving direction of the focus lens according to the history of obtained focus contrasts of the plurality of consecutive image signals immediately before stopping a continuous autofocus, and automatically notifies the moving direction of the focus lens to the driving unit.

* * * * *